United States Patent
Cooper et al.

(10) Patent No.: US 9,454,845 B2
(45) Date of Patent: Sep. 27, 2016

(54) SHADOW CONTOURING PROCESS FOR INTEGRATING 2D SHADOW CHARACTERS INTO 3D SCENES

(71) Applicant: DreamWorks Animation LLC, Glendale, CA (US)

(72) Inventors: Douglas Wayne Cooper, Glendale, CA (US); Robyn Nicholas Rindge, Glendale, CA (US)

(73) Assignee: Dreamworks Animation LLC, Glendale, CA (US)

( * ) Notice: Subject to any disclaimer, the term of this patent is extended or adjusted under 35 U.S.C. 154(b) by 417 days.

(21) Appl. No.: 13/830,479

(22) Filed: Mar. 14, 2013

(65) Prior Publication Data
US 2014/0267249 A1    Sep. 18, 2014

(51) Int. Cl.
*G06T 15/60*    (2006.01)
(52) U.S. Cl.
CPC .................................. *G06T 15/60* (2013.01)
(58) Field of Classification Search
None
See application file for complete search history.

(56) References Cited

U.S. PATENT DOCUMENTS

| 7,764,286 B1 * | 7/2010 | Kumar | 345/426 |
| 2005/0017974 A1 * | 1/2005 | Hong et al. | 345/426 |

* cited by examiner

*Primary Examiner* — Said Broome
(74) *Attorney, Agent, or Firm* — Morrison & Foerster LLP

(57) ABSTRACT

Systems and processes for contouring 2D shadow characters in 3D CGI scenes are provided. A simplified drawing surface may be added to a CGI scene and displayed from a first perspective to approximate a major surface where a shadow character may be located. A drawn shadow character may be received on the simplified drawing surface. A naturally-cast reference shadow of a corresponding 3D modeled character may be provided on the drawing surface to aid artists in developing the shadow character. An image of the drawn shadow character may be captured from a second perspective at the primary light source. The simplified drawing surface and drawn shadow character may be removed from the scene. The captured shadow character image may be projected into the scene from the second perspective, contouring naturally to object surfaces. The scene, including the shadow character, may be captured from a third perspective.

24 Claims, 17 Drawing Sheets

SHADOW CONTOURING PROCESS FOR INTEGRATING 2D SHADOW CHARACTERS INTO 3D SCENES

BACKGROUND

1. Field

This application relates generally to processes for rendering shadows in computer generated imagery (CGI) animation scenes and, more specifically, to computer systems and processes for integrating two-dimensional (2D) shadow characters into three-dimensional (3D) CGI scenes.

2. Related Art

CGI animation tools are available for generating naturally-cast shadows (or true shadows) in 3D animation scenes. Naturally-cast shadows may be based on various light sources in a 3D CGI environment. For example, a primary light source may generate naturally-cast shadows that appear highly realistic and uniform for the various illuminated objects in the scene. In an outdoor environment, for example, the primary light source may correspond to the sun, which may cause naturally-cast shadows with the appropriate size, shape, angles, interference, and the like based on the object geometry between the sun and the various surfaces in the environment. Moreover, multiple light sources in an environment may combine to soften shadows, cast additional shadows, and generally provide additional realism to the animated scene.

For some storylines, however, naturally-cast shadows may be insufficient. For example, a storyline may include a shadow character that may move, talk, or otherwise perform independently from a 3D modeled character. Such a shadow character may be made to appear as a featured element—an animated character itself—in a scene as opposed to a naturally-cast shadow that may add realism as part of the background. For example, the naturally-cast shadow of a 3D modeled character may come alive and deviate from the naturally-cast form that would typically be produced by scene lighting (e.g., talking on its own, gesturing on its own, etc.).

Incorporating 2D shadow characters into a 3D CGI scene, however, can be geometrically challenging, time consuming, and tedious, among other things. Typically, animators may draw such a shadow character into each frame by hand. Drawing such complex shapes with the appropriate curvature, distortion, angle, interference, and the like can be very time consuming, and it may lead artists to spend considerable time focusing on the technical details of how the shadow falls in the scene compared to the basic performance of the shadow character. In other words, a shadow character's movements and features—that may be important to the storyline—may suffer due to the complexity of getting the shadow to accurately interact with and conform to objects in an environment. Moreover, with the tedious task of drawing the shadow character frame after frame, human error can cause registration problems, wobbly lines, and other artifacts that may cause the drawn shadow character to look fake and unnatural. Such errors and artifacts may end up distracting from the storyline and weakening the role of the shadow character.

In addition, manually drawing a shadow character into each frame with precise contouring can make any later changes to a scene layout prohibitively expensive and time consuming. For example, as film production progresses, it may become desirable to modify a scene by moving objects, changing characters, adjusting lighting, or adjusting various scene elements. However, doing so may require redrawing a shadow character in each frame of the modified environment—with accurate contouring—to accurately depict changes. Such a tedious frame-by-frame process is a stark contrast to the powerful CGI tools available to rapidly implement changes and re-render scenes as desired.

Thus, systems and processes for integrating 2D drawn shadow characters in 3D CGI scenes with realistic contouring on 3D objects are desired.

SUMMARY

Systems and processes for integrating 2D drawn shadow characters in 3D CGI scenes with contouring on 3D objects are described. A simplified drawing surface may be added to the 3D CGI scene. The simplified drawing surface may approximate a 3D object surface in the 3D CGI scene. The simplified drawing surface may be displayed in the 3D CGI scene from a first perspective. A drawn shadow character may be received on the simplified drawing surface. An image of the drawn shadow character may be captured from a second perspective. The simplified drawing surface and the drawn shadow character may be removed from the 3D CGI scene. The captured image of the drawn shadow character may be projected into the 3D CGI scene from the second perspective. The projected image may contour to at least the 3D object surface in the scene.

The 3D CGI scene, including the projected drawn shadow character, may be captured from a third perspective. Boundaries may be displayed in the first perspective corresponding to a field of view of the third perspective. The 3D CGI scene may include a 3D modeled character, and the drawn shadow character may correspond to the 3D modeled character. A naturally-cast reference shadow corresponding to the 3D modeled character may be displayed in the first perspective. Naturally-cast reference shadows of objects in the 3D CGI scene may also be displayed in the first perspective.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

Figure 1B:
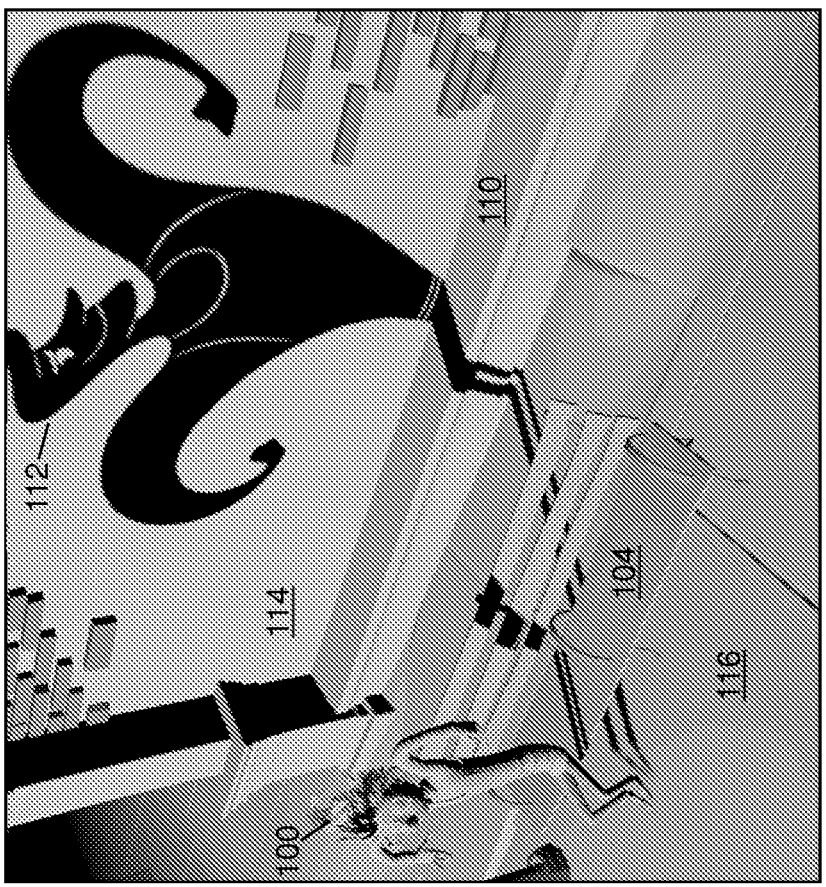
FIG. 1B illustrates an exemplary 3D CGI scene, from the view of a shot camera, with a shadow character replacing a naturally-cast shadow.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various embodiments are described herein relating to shadow contouring systems and processes for automatically generating realistic contouring for 2D shadow characters in 3D CGI scenes. An exemplary process may include temporarily adding a simplified drawing surface to a CGI scene. An artist may view the drawing surface in the scene from a virtual camera (e.g., from a drawing camera). The artist may draw a shadow character on the simplified drawing surface or otherwise place a 2D shadow character onto the simplified drawing surface. In some embodiments, a naturally-cast shadow may be provided on the drawing surface as a reference for the artist. In other embodiments, background shadows cast by objects in the scene may also be provided as a reference for the artist. In still other embodiments, an area of the scene may be highlighted or otherwise emphasized to show which regions are and are not visible in the view of the virtual shot camera (the view from which the scene will be captured) to enable the artist to focus primarily on shot-visible regions.

After the 2D shadow character is drawn on the simplified drawing surface, a view or image of the shadow character may be captured from a contour camera, which may be located near the primary light source (e.g., a virtual camera at or near the primary light source). In some instances, the view of the 2D shadow character from the contour camera may appear whole, unbroken, or undistorted. The simplified drawing surface and drawn character may then be removed from the scene. The captured image or view of the shadow character from the contour camera may then be projected into the scene from the contour camera, falling on scene objects and contouring to the complex shapes of scene objects automatically. In some embodiments, projecting the captured view of the shadow character into the scene may include obscuring or blocking the primary light source with the captured shadow character such that a naturally-cast shadow in the shape of the shadow character falls into the scene. CGI settings may be modified to exclude objects from being obscured by the shadow character during rendering (e.g., exclude a related 3D modeled character from being shaded by the shadow character). Similarly, naturally-cast shadows for some objects may be deselected and prevented from being rendered into the scene (e.g., the naturally-cast shadow of a related 3D modeled character may be excluded from rendering). A 2D shadow character may thus be integrated into a 3D CGI scene, and the complex contouring of the shadow character may be automatically generated in the process. The scene, including the shadow character, may be captured from a shot camera.

Figure 1A:
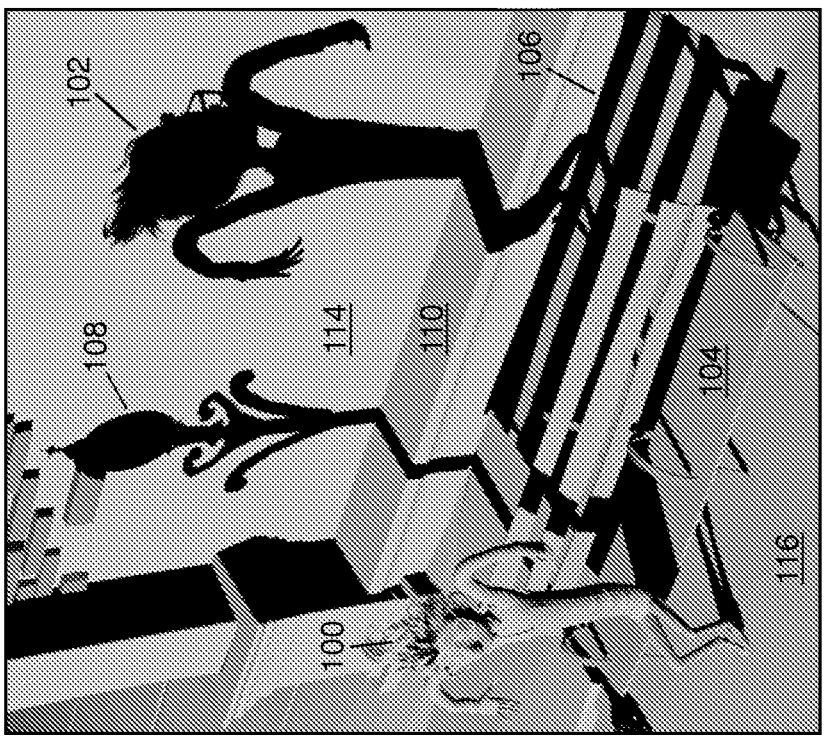
FIG. 1A illustrates an exemplary 3D CGI scene, from the view of a shot camera, with naturally-cast shadows.

FIG. 1A illustrates an exemplary 3D CGI scene with naturally-cast shadows. The view may be from a shot camera—a virtual camera in the CGI environment that may be used to capture or record the scene. As illustrated, the exemplary scene includes 3D modeled character 100 seated on bench 104. Shadow 102 may be a naturally-cast shadow generated by a primary light source that illuminates the front of character 100. In other instances, such a naturally-cast shadow may be cast from any other light source placed in various other locations as desired (e.g., to achieve different creative results or the like). Bench 104 similarly casts a naturally-cast shadow 106, and a lamp outside the shot casts a naturally-cast shadow 108. Notably, shadows 102, 106, and 108 each conform to the complex contours of scene objects as a shadow would in a real environment illuminated by a real light source. In particular, naturally-cast shadows 102, 106, and 108 fall in what appears to be a natural and accurate manner across ground 116, ledge 110, and brick wall 114. This accurate shadow contouring that may be automatically generated by CGI tools may add realism to an animated film, which may allow for better viewer engagement with the film.

FIG. 1B illustrates an exemplary 3D CGI scene, from the view of a shot camera, with shadow character 112 replacing a naturally-cast shadow (e.g., shadow 102 of FIG. 1A). In one example, the storyline for an animated film may call for a character in the form of a shadow (e.g., shadow character 112) of a full 3D modeled character (e.g., character 100). However, unlike naturally-cast shadows, it may be desired that the shadow character be capable of moving and otherwise performing independently from the movements of the related 3D modeled character. In the 3D CGI environment, it may also be desired that at least portions of the shadow character conform realistically to the objects in the environment to maintain the realism that CGI animation may provide.

Shadow character 112 may be generated according to the various embodiments discussed herein to provide a unique character (e.g., with different features like hair, eyes, profile, etc.) that still contours accurately—at least in part—across surfaces in the CGI environment. For example, as illustrated, the legs of shadow character 112 may fall accurately on bench 104, ground 116, and ledge 110, contouring to the surfaces in the same manner as the naturally-cast shadows shown in FIG. 1A. Moreover, although markedly different from naturally-cast shadow 102 of FIG. 1A, shadow character 112 may still be accurately proportioned on brick wall 114 according to the relative angle of the primary light source. For example, on brick wall 114, the upper right portion of shadow character 112 may be larger than the lower left portion of shadow character 112 based on a light source that is nearer to the left side of shadow character 112. A unique shadow character may thus be integrated into a 3D CGI scene while maintaining the realism of naturally-cast shadows using the various embodiments discussed herein.

Figure 2:
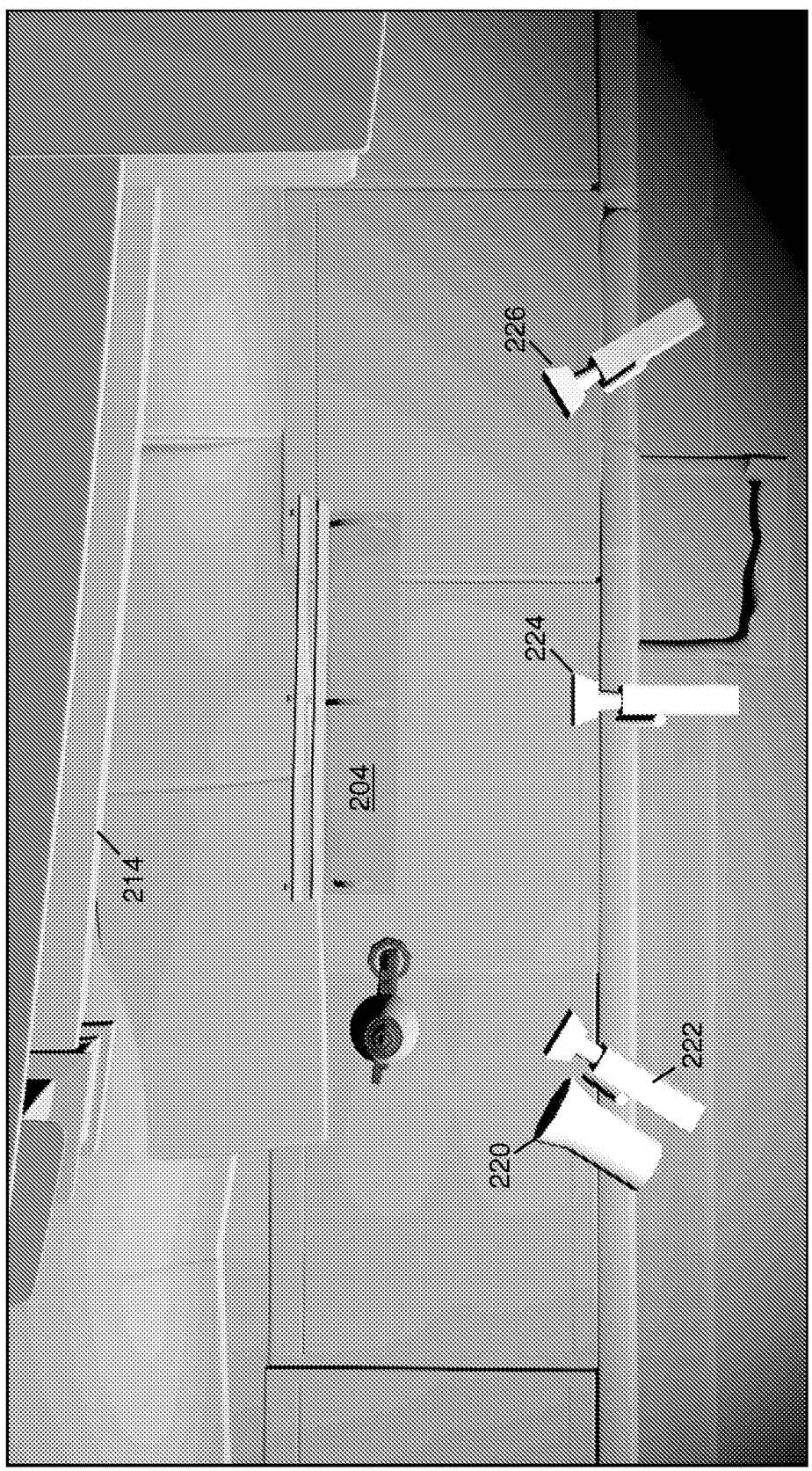
FIG. 2 illustrates an exemplary 3D CGI scene with a primary light source, contour camera, drawing camera, and shot camera.

FIG. 2 illustrates a 3D CGI scene with exemplary CGI elements and tools that may be used in the various embodiments discussed herein. In the illustrated example, the scene includes bench 204 and wall 214 that may be the same as bench 104 and wall 114 of FIGS. 1A and 1B. Primary light source 220 may provide the most significant lighting of the scene that may be primarily responsible for the shadows cast in the scene. Other light sources that are not illustrated may also be present to illuminate the scene. Shot camera 226 may be a virtual camera that can capture or record a view of the scene. Drawing camera 224 may likewise be a virtual camera that can capture a view of the scene and may be used, for example, to offer animators a view of the environment that is easier to visualize and in which to draw new elements (e.g., straight-on as opposed to an awkward side angle).

Contour camera 222 may likewise be a virtual camera that can capture a view of the scene and may be used, for example, to capture a view of a drawn shadow character from a vantage point at or near primary light source 220. Although shown adjacent to primary light source 220, in some instances, it may be desirable to place contour camera 222 in the same or nearly the same position as primary light source 220 (e.g., overlapping in space). In other embodiments, contour camera 222 may be placed near or at the same location as a shot camera (e.g., shot camera 226) or at various other locations of the scene to creatively alter contouring effects that may be achieved according to the various embodiments discussed herein. In some embodiments, contour camera 222 may also be capable of projecting a previously-captured shadow character into a scene as will be discussed in further detail below. The various elements and tools illustrated in FIG. 2 are illustrative, and it will be apparent to those of ordinary skill in the art that additional virtual cameras may be used, elements may be rearranged, light sources may be repositioned, cameras may be repositioned, and the like. Moreover, although FIG. 2 is illustrated in a flat plane, the various elements may be positioned at varying heights and angles in 3D space as desired (e.g., to capture different views, generate different effects, and the like).

Figure 3:
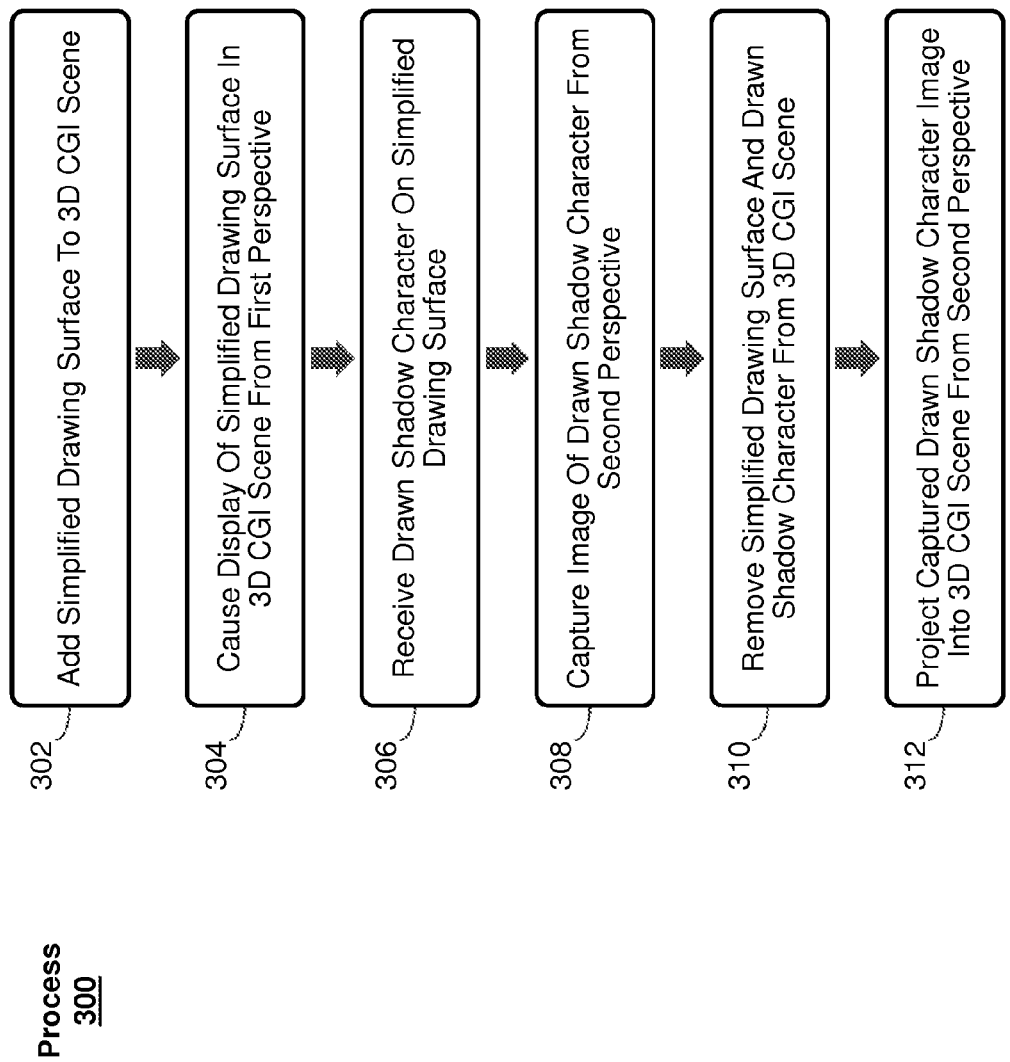
FIG. 3 illustrates an exemplary process for integrating a 2D shadow character into a 3D CGI scene.
Figure 4:
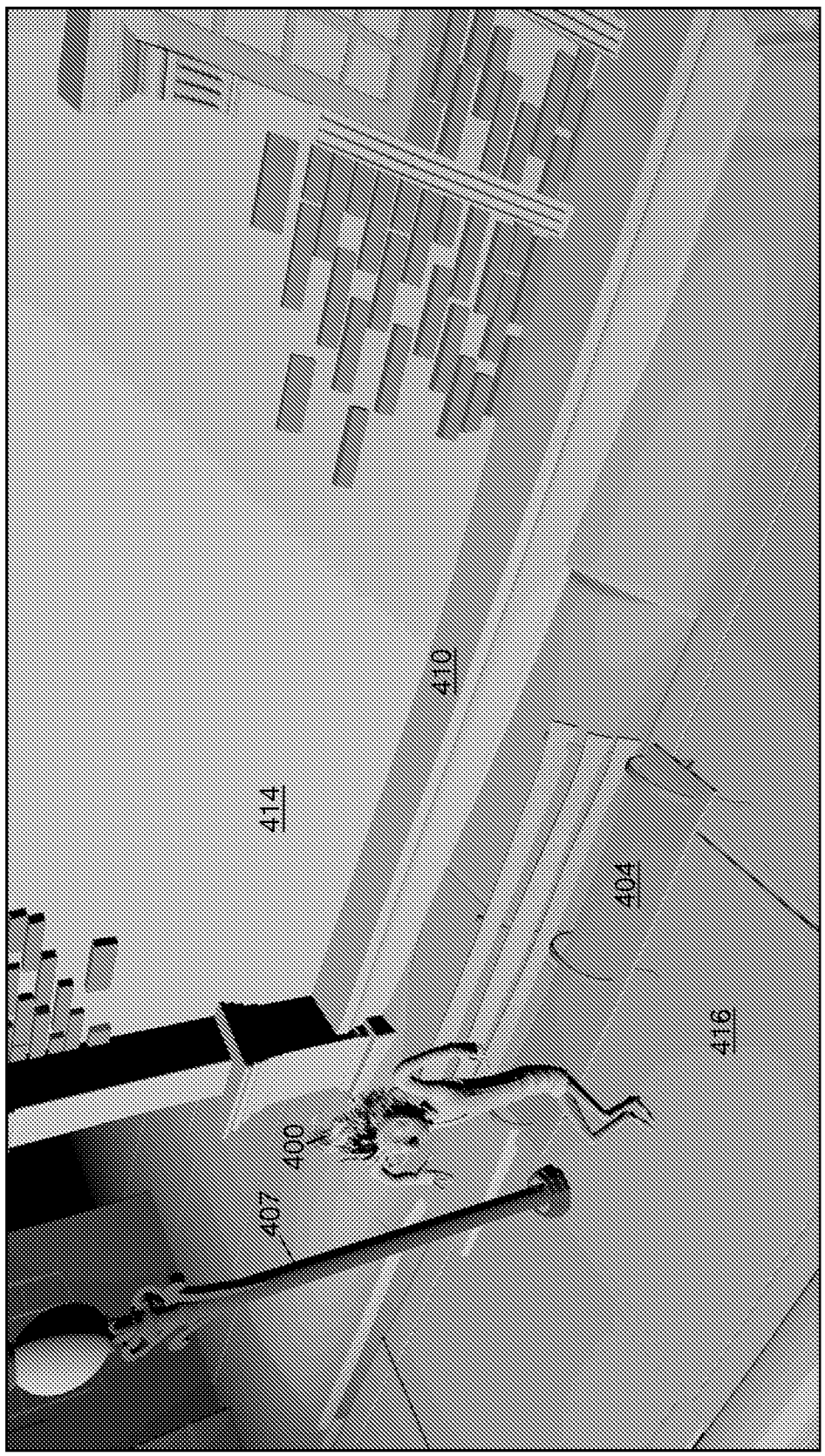
FIG. 4 illustrates an exemplary 3D CGI scene, from the view of a shot camera, with 3D modeled objects.

FIG. 3 illustrates exemplary process 300 for integrating a 2D shadow character into a 3D CGI scene. Before beginning process 300, an animator, artist, or the like may have generated a scene, such as that illustrated in FIG. 4 or FIG. 5, which may be modified following process 300 to include a shadow character. FIG. 4 illustrates an exemplary 3D CGI scene with 3D modeled objects that may have either naturally-cast shadows or a shadow character generated according to process 300. FIG. 4 may be a view from a shot camera (e.g., shot camera 226 of FIG. 2). In the illustrated example, various 3D objects may have been modeled and added to the 3D environment. For example, character 400, lamp 407, and bench 404 may each be 3D modeled objects in the environment. In addition, several 3D surfaces may define the bounds of the scene including ground 416, ledge 410, and brick wall 414. As illustrated, lighting and naturally-cast shadows may not yet have been fully integrated into the scene. Notably, however, the details of some surfaces and shapes in the scene may make accurately contouring shadows to the scene objects particularly challenging. For example, depending on the location of the primary light source (e.g., primary light source 220 of FIG. 2), shadows of character 400, bench 404, and lamp 407 may fall across ground 416, ledge 410, and brick wall 414. Providing realistic shadow contouring according to process 300 of FIG. 3 may thus include contouring shadows in a geometrically accurate way across the various surfaces.

Figure 5:
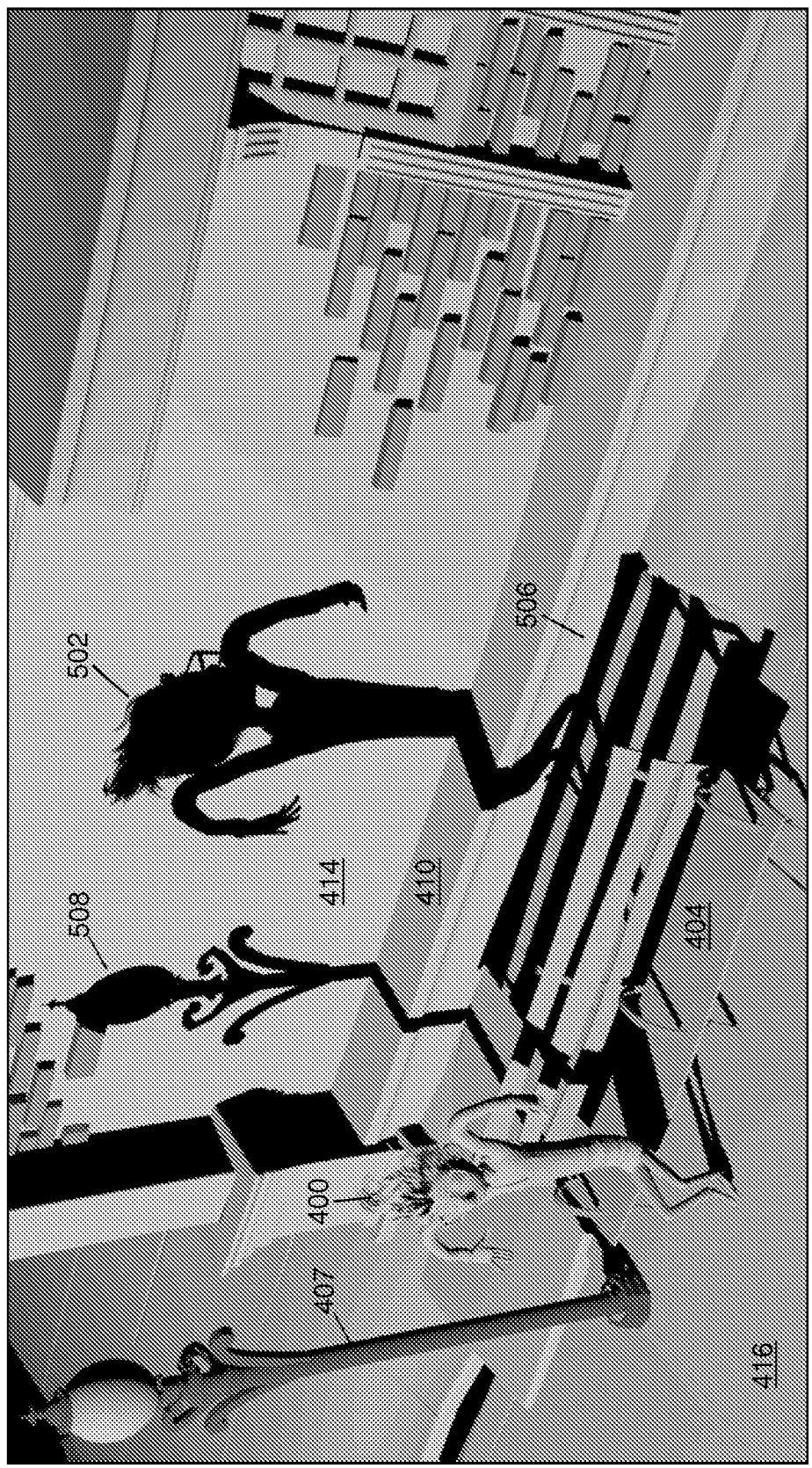
FIG. 5 illustrates an exemplary 3D CGI scene, from the view of a shot camera, showing naturally-cast shadows from a primary light source.

FIG. 5 illustrates an exemplary 3D CGI scene with CGI-generated, naturally-cast shadows that may be modified following process 300 of FIG. 3 to, for example, incorporate a shadow character. FIG. 5 may be a view from a shot camera (e.g., shot camera 226 of FIG. 2). As illustrated, the exemplary scene includes 3D modeled character 400 seated on bench 404 next to lamp 407. Shadows 502, 506, and 508 may be naturally-cast shadows generated because of a primary light source that illuminates the front side of character 400 (e.g., primary light source 220 of FIG. 2). Shadows 502, 506, and 508 may contour to the various 3D objects in the scene as a shadow would in a real environment with a real light source. In particular, shadows 502, 506, and 508 may fall naturally and accurately across ground 416, ledge 410, and brick wall 414. Such naturally-cast shadows may be automatically generated by a CGI animation tool resulting in accurate geometry and realism in the scene. However, it may be desirable to replace a naturally-cast shadow—following process 300 of FIG. 3—with a shadow character that may be independently animated. Similarly, it may be desirable to modify naturally-cast shadows, introduce shadow objects that may be animated separately from modeled CGI objects, or the like. Accordingly, process 300 of FIG. 3 may be used to integrate a 2D shadow character into such a 3D CGI scene. In particular, following process 300, shadow 502 may be replaced with a shadow character that may be animated independently from 3D modeled character 400.

Figure 7:
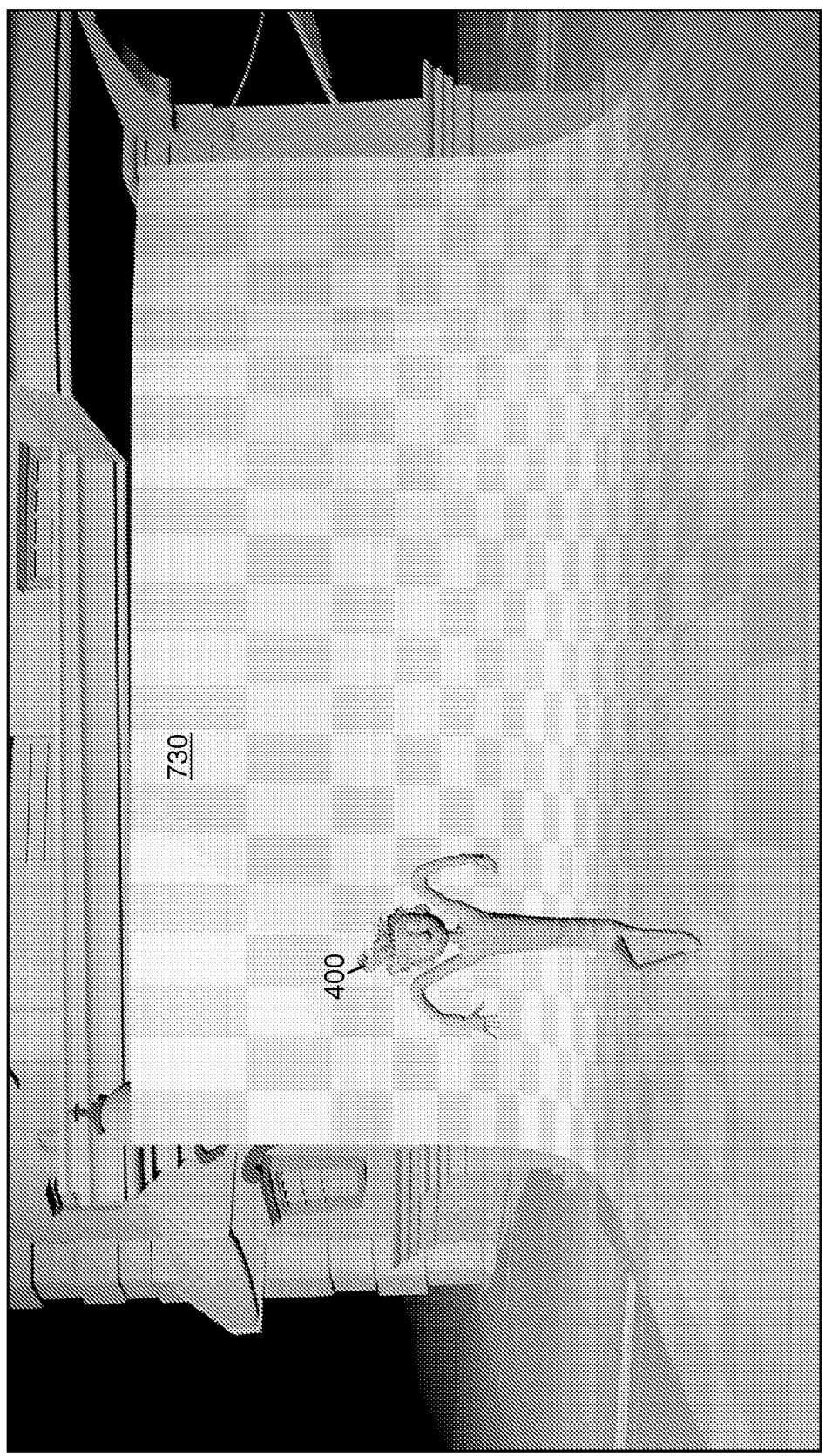
FIG. 7 illustrates an exemplary 3D CGI scene, from the view of a drawing camera, with a drawing surface inserted.

Referring again to FIG. 3, at block 302, a simplified drawing surface (or canvas) may be added to a 3D CGI scene that may be displayed from a first perspective at block 304. Such a first perspective may correspond to the view from a drawing camera (such as drawing camera 224 of FIG. 2), and adding and displaying a simplified drawing surface from such a first perspective may facilitate ease of visualization and drawing for an artist at an angle that may be more comfortable and natural for animating the scene. In other embodiments, such a first perspective may be the same as or different from various other perspectives discussed herein (e.g., from a shot camera or contour camera), or such a first perspective may include a different view or angle from which it may be easier or more desirable for an artist to animate the scene. An example simplified drawing surface 730 is illustrated in FIG. 7 from such a first perspective that may be at an angle that is more comfortable for animating a scene than from, for example, a shot camera view as illustrated in FIG. 4 or FIG. 5.

Figure 6:
FIG. 6 illustrates an exemplary 3D CGI scene from the view of a drawing camera.

FIG. 6 illustrates an exemplary 3D CGI scene from the view of a drawing camera (e.g., drawing camera 224 of FIG. 2) before a simplified drawing surface is added to the scene. The illustrated scene may be the same as FIGS. 4 and 5 from a different perspective. Assuming a primary light source positioned as in FIG. 2 (e.g., primary light source 220), the bulk of the shadows in the scene may fall on brick wall 414 (as illustrated by the naturally-cast shadows in FIG. 5). As such, it may be desired that the added shadow character be primarily animated on brick wall 414. For ease of animation and understanding, it may then be desired to provide animators with a perspective such as the one illustrated in FIG. 6 (e.g., straight-on as opposed to an awkward angle). For example, an animator may find it easier to draw a shadow character on brick wall 414 from a perspective that may be parallel to the wall as opposed to an awkward angle that may correspond to the shot camera (e.g., shot camera 226 of FIG. 2). In some instances, animators may prefer to draw with limited perspective in their drawings (limiting awkward angles that may be common with naturally-cast shadows), so a view may be provided that minimizes the amount of perspective and allows animators to draw more comfortably with limited perspective in their drawings. In other examples and scenes, prominent surfaces may be identified, and a perspective parallel to those surfaces may be provided for animators. In other embodiments, animators may select a desired perspective view based on the desired animation or character view.

As illustrated, from the drawing camera view in FIG. 6, an animator may find it difficult to draw a shadow character into the scene while maintaining accurate geometry and contouring for ground 416, bench 404, character 400, lamp 407, ledge 410, and brick wall 414. For example, achieving the correct angles and accurate contouring on ledge 410 may include complex geometry to accurately reflect the surface changes in ledge 410. As such, manually contouring a shadow character into such a scene may be time consuming and undesirable. Animators may instead prefer to focus their attention on the main animation or performance details of the shadow character that may appear on the primary surface in the scene. For example, in creating a shadow character corresponding to character 400, animators may prefer to focus on the movements, expressions, and details of the shadow character that may appear on brick wall 414 and may prefer that the contouring effects and interactions with scene elements be automatically handled as with naturally-cast shadows in the 3D CGI environment.

To enable animators to focus on the main animation details of the shadow character as desired, a simplified drawing surface may be added to a 3D CGI scene and displayed for animators. In some embodiments, a simplified drawing surface may approximate the primary surface or surfaces of the scene, may approximate the surface or surfaces on which the shadow character will be animated, or the like. For example, as illustrated in FIG. 7, simplified drawing surface 730 may approximate the ground and curve up to approximate the brick wall. In other embodiments, a simplified drawing surface may approximate other significant surfaces or planes in the scene. A simplified drawing surface may also approximate a plane or planes in the scene with the least amount of change frame to frame. In some embodiments, as illustrated in FIG. 7, a simplified drawing surface may replace various elements in the scene or be put into the scene to obscure complex objects (e.g., replacing or hiding the brick wall, ledge, ground, bench, lamp, and the like in FIG. 7). By doing so, the simplified drawing surface may provide a basic background for animators to use to focus on drawing the animation details of the shadow character without worrying about contouring to complex shapes and objects in the scene (e.g., the ledge below the brick wall).

Simplified drawing surface 730 may include a checkerboard pattern as illustrated in FIG. 7 to provide a perspective and angle reference to animators. In other embodiments, however, a simplified drawing surface may be blank or may have other grids, patterns, shading, reference points, or the like to aid animators drawing on the surface. Moreover, character 400 may be included in the view illustrated in FIG. 7 as a reference point for animators, but in other embodiments, characters may be omitted or other scene elements may be added as desired to aid the animator. In still other embodiments, animators may be able to add and remove objects from a drawing view, such as the one illustrated in FIG. 7, to aid them as they draw or otherwise place a shadow character into the scene.

Figure 8:
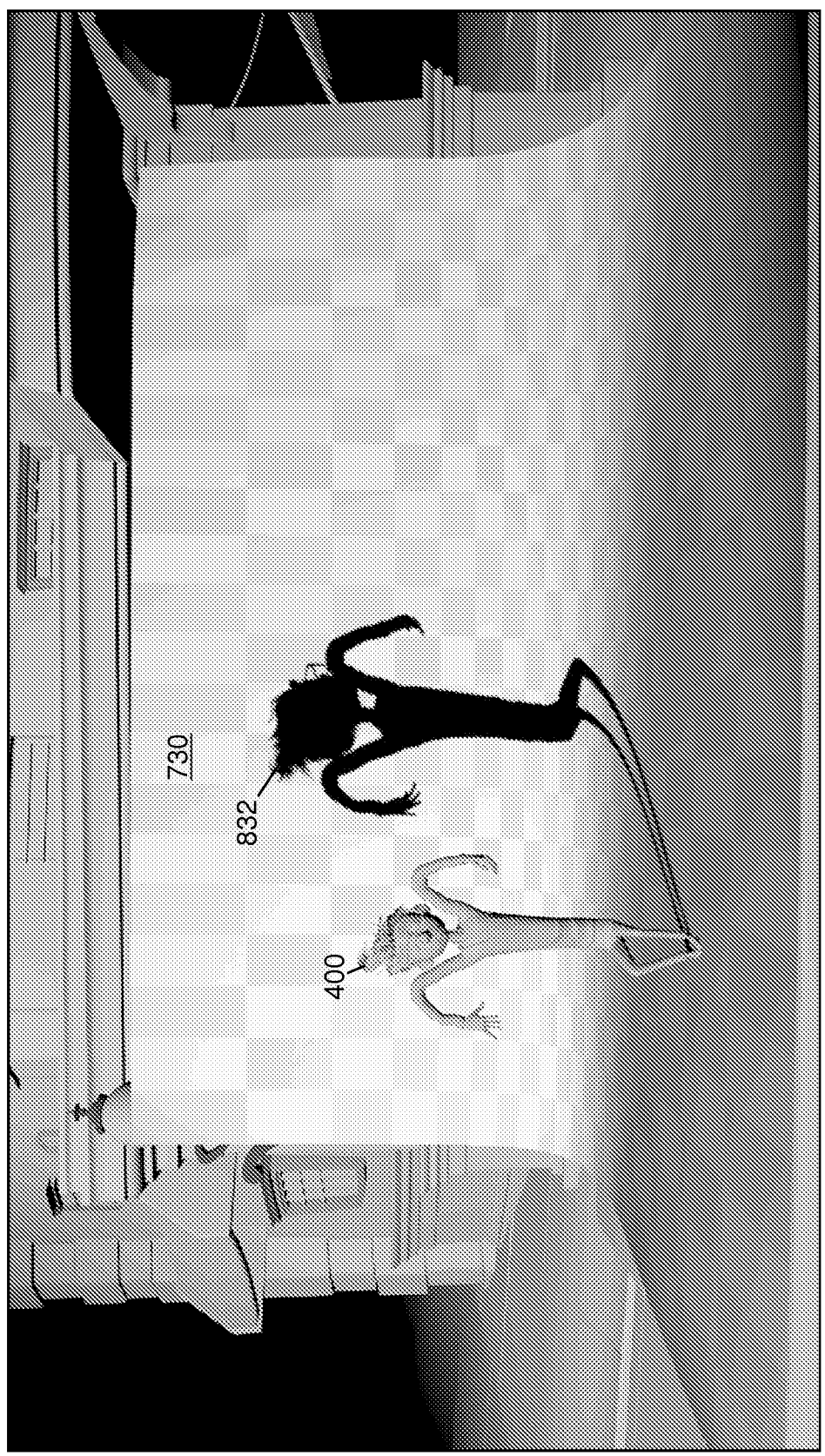
FIG. 8 illustrates an exemplary 3D CGI scene, from the view of a drawing camera, with a naturally-cast shadow on a drawing surface.

FIG. 8 illustrates the exemplary 3D CGI scene and simplified drawing surface 730 of FIG. 7 with naturally-cast reference shadow 832 provided as a reference in a drawing perspective view. In some embodiments, a naturally-cast reference shadow may be provided (e.g., displayed) to aid animators in drawing or otherwise placing a shadow character into the scene. Such a naturally-cast shadow may be automatically generated with CGI tools from a light source, such as primary light source 220 of FIG. 2, and projected onto a simplified drawing surface or otherwise provided in the drawing perspective view. In other instances, such a naturally-cast shadow may be generated from any other light source in any other location. A naturally-cast shadow may also be cast based on the geometry of the corresponding 3D modeled character, based on a modified version of a 3D modeled character that may not appear in a shot, or based on other geometries, characters, figures, or the like as desired (e.g., to obtain various creative results, to obtain a particular desired reference shadow, or the like).

As illustrated, reference shadow 832 may provide a general reference of the contour of a naturally-cast shadow for an animator to emulate with a shadow character. For example, the swooping curvature of the legs of reference shadow 832 may be used by an animator to provide similar curvature to the legs of a shadow character that may correspond to character 400. In other embodiments, an animator may use reference shadow 832 as the foundation for a shadow character. For example, an animator may modify portions of reference shadow 832 in creating a shadow character while leaving other portions of reference shadow 832 intact to become a part of the shadow character (e.g., replacing only the head, upper body, arms, or the like while retaining the legs, lower body, or the like). In still other embodiments, reference shadow 832 may aid animators to align a shadow character in a believable way in relation to 3D modeled character 400. Animators may also use reference shadow 832 to determine shadow character proportions, positioning, and the like. A reference shadow may thus be provided as a valuable tool to aid animators in developing a shadow character and integrating it into a scene.

Figure 9:
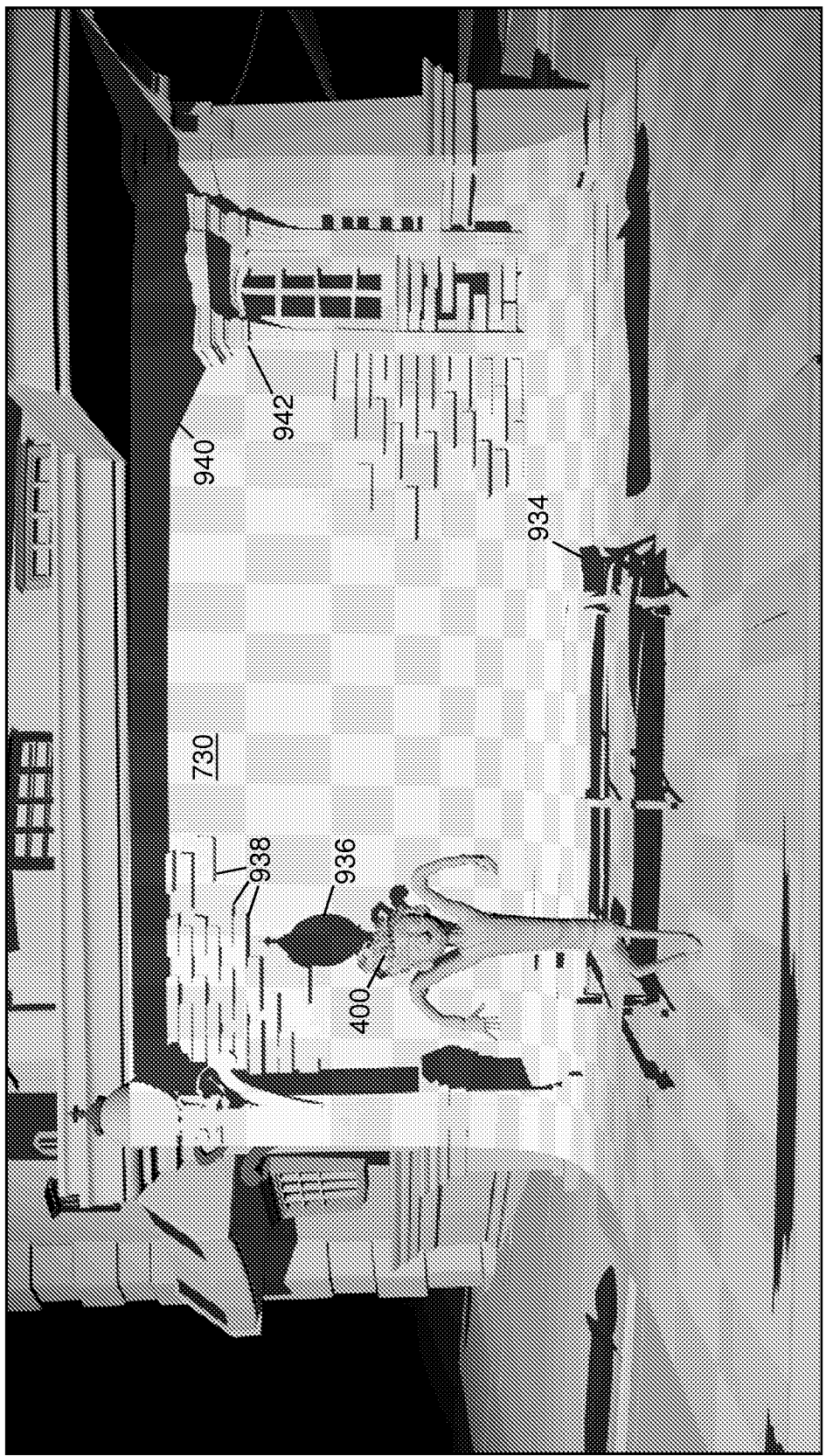
FIG. 9 illustrates an exemplary 3D CGI scene, from the view of a drawing camera, with naturally-cast environment shadows on a drawing surface.

Similarly, FIG. 9 illustrates the exemplary 3D CGI scene and simplified drawing surface 730 of FIG. 7 with naturally-cast environment shadows provided (e.g., displayed) as a reference in a drawing perspective view. In some embodiments, naturally-cast environment shadows may be provided to further aid animators in drawing or otherwise placing a shadow character into the scene. For example, in placing a shadow character, animators may want to avoid areas where the character would interfere with or disappear into other shadows. Similarly, animators may want to get a sense of nearby shadows to avoid too many distracting shadows that might draw attention away from a shadow character. Environment shadows may further aid animators as a reminder of the complete scene before the simplified drawing surface was added.

In the example illustrated in FIG. 9, bench shadow 934 may provide a reference for an animator suggesting that the region near bench shadow 934 may obscure the shadow character's features if positioned in that region. Similarly, lamp shadow 936 and brick shadows 938 may provide a frame or bound to the underlying brick wall, and may suggest to an animator that a shadow character should be positioned away from those bounds to avoid distracting shadow interference. Wall overhang shadow 940 may likewise provide an upper bound to where the shadow character may preferably be positioned to avoid shadow interference there as well. Window 942 may also be provided and may include 3D features as well as shadow features to provide a reminder of the underlying scene. The combination of environment shadows may thus suggest to the animator that the shadow character may ideally be positioned near the center of simplified drawing surface 730 to provide ample space for animating the character frame after frame.

In other embodiments, environment shadows may be provided to identify regions for the animator that may not need to be drawn or be as detailed due to shadow interference. For example, if an object in the scene casts a shadow on a surface that will likely interfere with a shadow character, the animator may accept the interference and avoid spending additional time detailing the shadow character where interference may occur. Environment shadows may thus save artist time in addition to providing useful guidance on where to position a shadow character.

Figure 10:
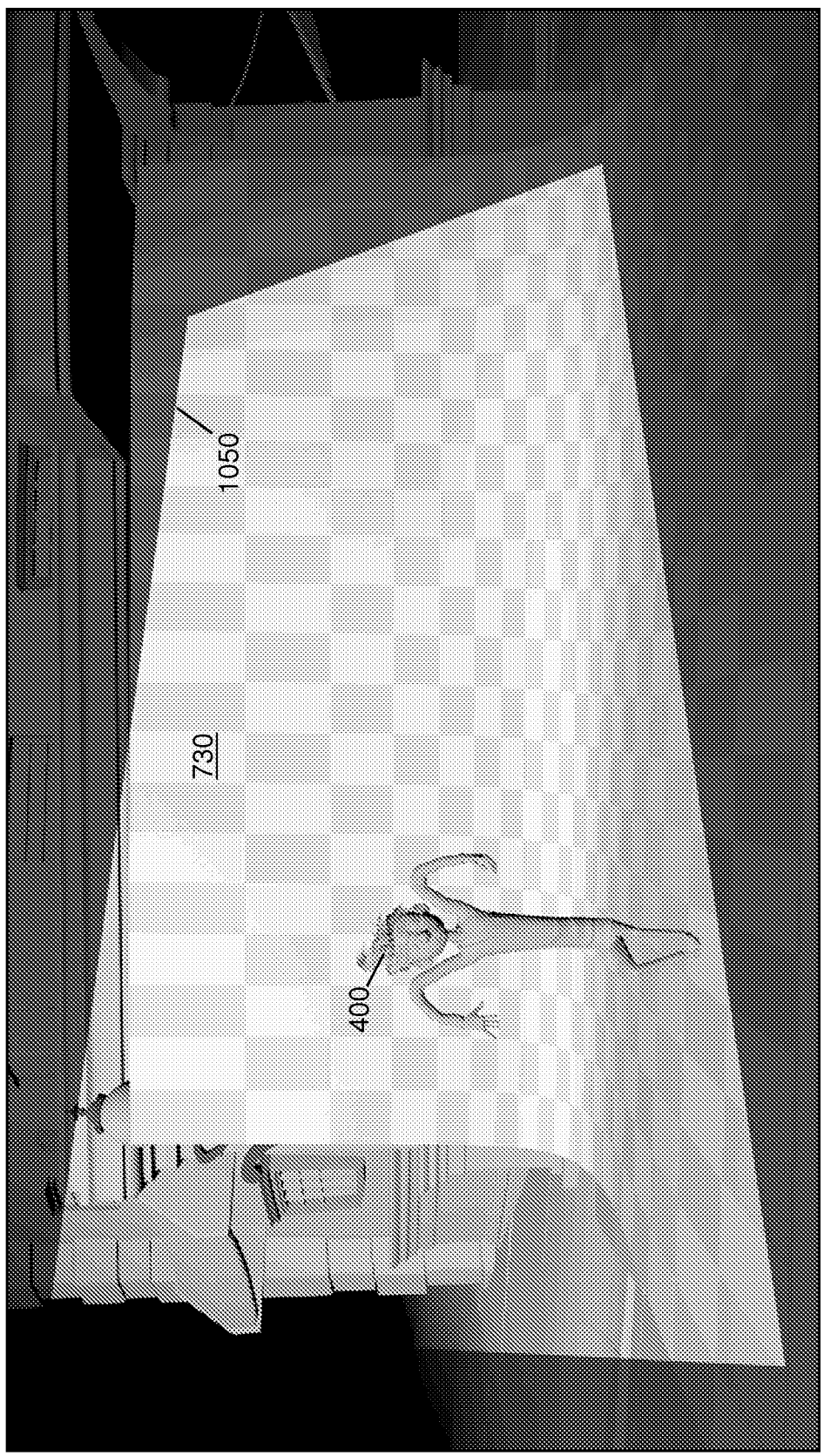
FIG. 10 illustrates an exemplary 3D CGI scene, from the view of a drawing camera, with a shot camera field of view highlighted.

FIG. 10 illustrates yet another view that may be provided (e.g., displayed) to animators to aid them in integrating a shadow character into a scene. FIG. 10 illustrates the exemplary 3D CGI scene and simplified drawing surface 730 of FIG. 7—from the view of a drawing camera—with a shot camera field of view (or frustum) highlighted as a reference. In some embodiments, the field of view of the shot camera that may be used to capture the scene may be provided to identify for animators what may appear in the ultimate captured shot and what may not. Animators may thereby avoid wasting time drawing in regions outside the field of view of the shot camera (regions that may not be visible in the ultimate captured frame). In the illustrated example, field of view 1050 may include boundaries (e.g., borders, lines, a quadrilateral, a rectangular pyramid, shading variations, complex shapes, or the like) that set apart a region to indicate areas that are visible to the shot camera (which may correspond to shot camera 226 of FIG. 2). In FIG. 10, field of view 1050 may be set apart by boundaries by shading all regions outside the field of view, leaving field of view 1050 to appear emphasized, highlighted, brighter, or the like. In other embodiments, however, other indicators may be used to identify the field of view of the shot camera, such as outlining the field of view, coloring the field of view in a distinct way, coloring regions outside the field of view in a distinct way, removing regions that are not visible to the shot camera, or the like. In some instances, the shape of the camera field of view may vary and may be arbitrarily complex (e.g., based on camera angles or the like), and the boundaries or other highlighting mechanisms may vary accordingly. A shot camera field of view may thus be emphasized in a displayed drawing view to further aid animators in integrating a shadow character into the scene.

Figure 11:
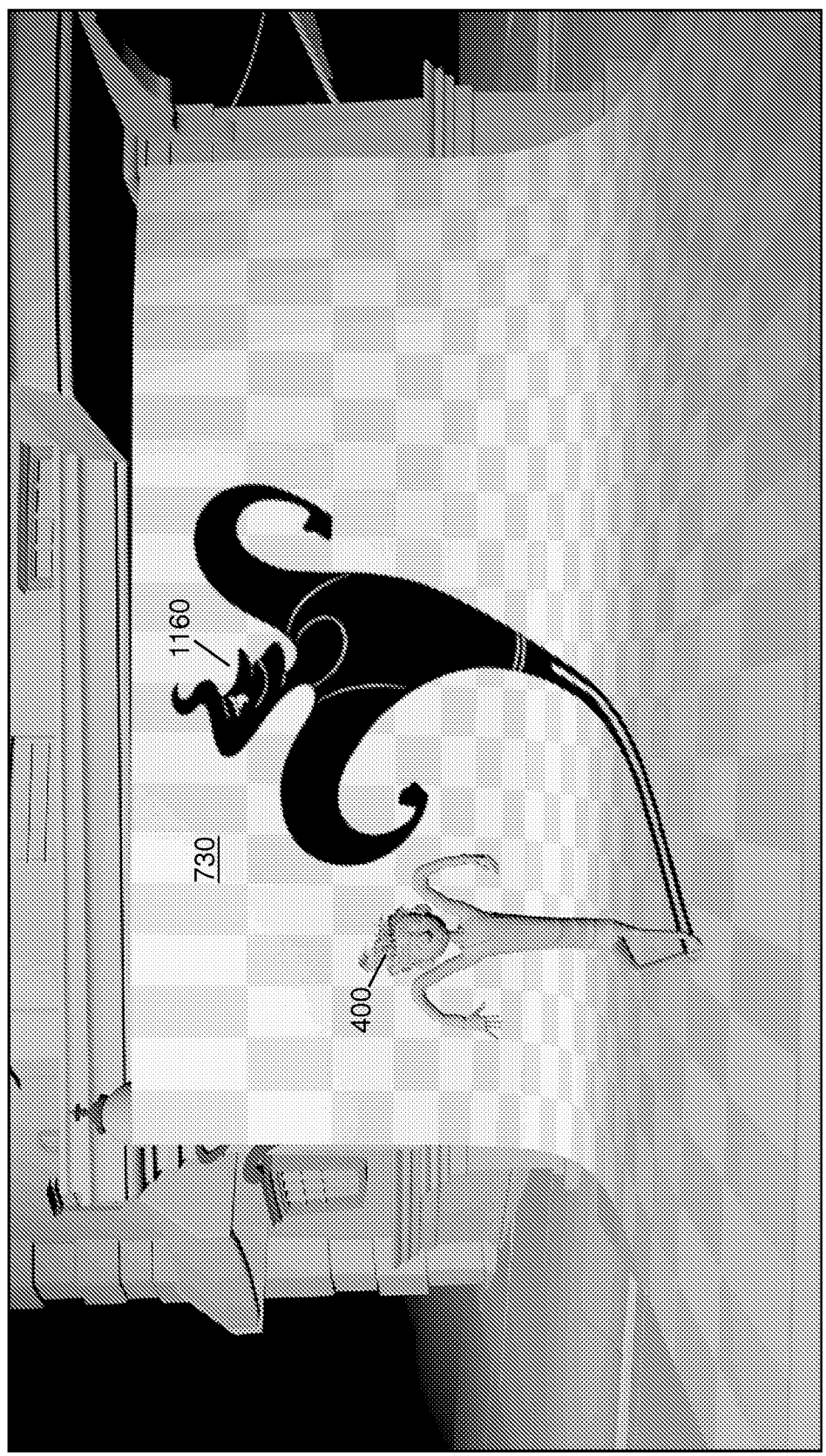
FIG. 11 illustrates an exemplary 3D CGI scene, from the view of a drawing camera, with a shadow character drawn on a drawing surface.

Referring again to process 300 of FIG. 3, at block 306, a drawn shadow character may be received on the simplified drawing surface. An artist, animator, or the like may provide a drawn shadow character on the simplified drawing surface. FIG. 11 illustrates the exemplary 3D CGI scene and simplified drawing surface 730 of FIG. 7—from the view of a drawing camera—with shadow character 1160 drawn on the drawing surface. A shadow character may be drawn and received onto the drawing surface in a variety of ways. For example, an animator may draw the shadow character onto the drawing surface using a computer (e.g., workstation, laptop, tablet, Cintig™, etc.). A drawn shadow character may also be projected into the scene and onto the simplified drawing surface. An animator may also copy a drawn shadow character into the scene and onto the drawing surface or otherwise place a digital version of a shadow character onto the drawing surface. An animator may, for example, hand-draw a shadow character; scan, capture, or film the hand drawing; and place the drawn shadow character onto the drawing surface in the scene. Still other methods are possible for receiving a drawn shadow character on a simplified drawing surface as will be apparent to those of ordinary skill in the art. As illustrated in FIG. 11, corresponding 3D modeled character 400 may be provided to allow the animator to correctly place shadow character 1160 (e.g., connect the feet of shadow character 1160 to the feet of 3D modeled character 400).

Figure 12A:
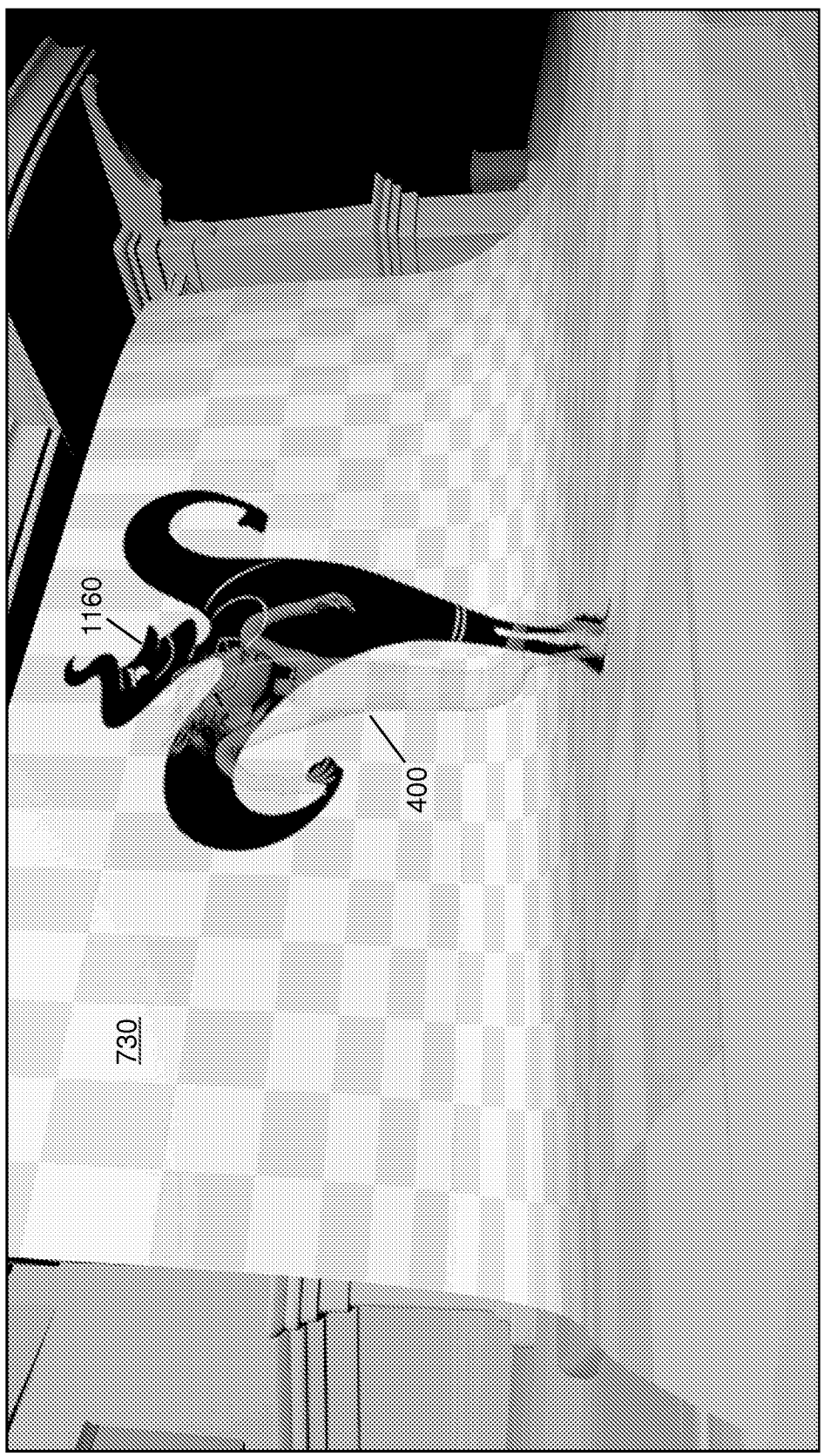
FIG. 12A illustrates an exemplary 3D CGI scene, from the view of a contour camera, with a shadow character drawn on a drawing surface.
Figure 12B:
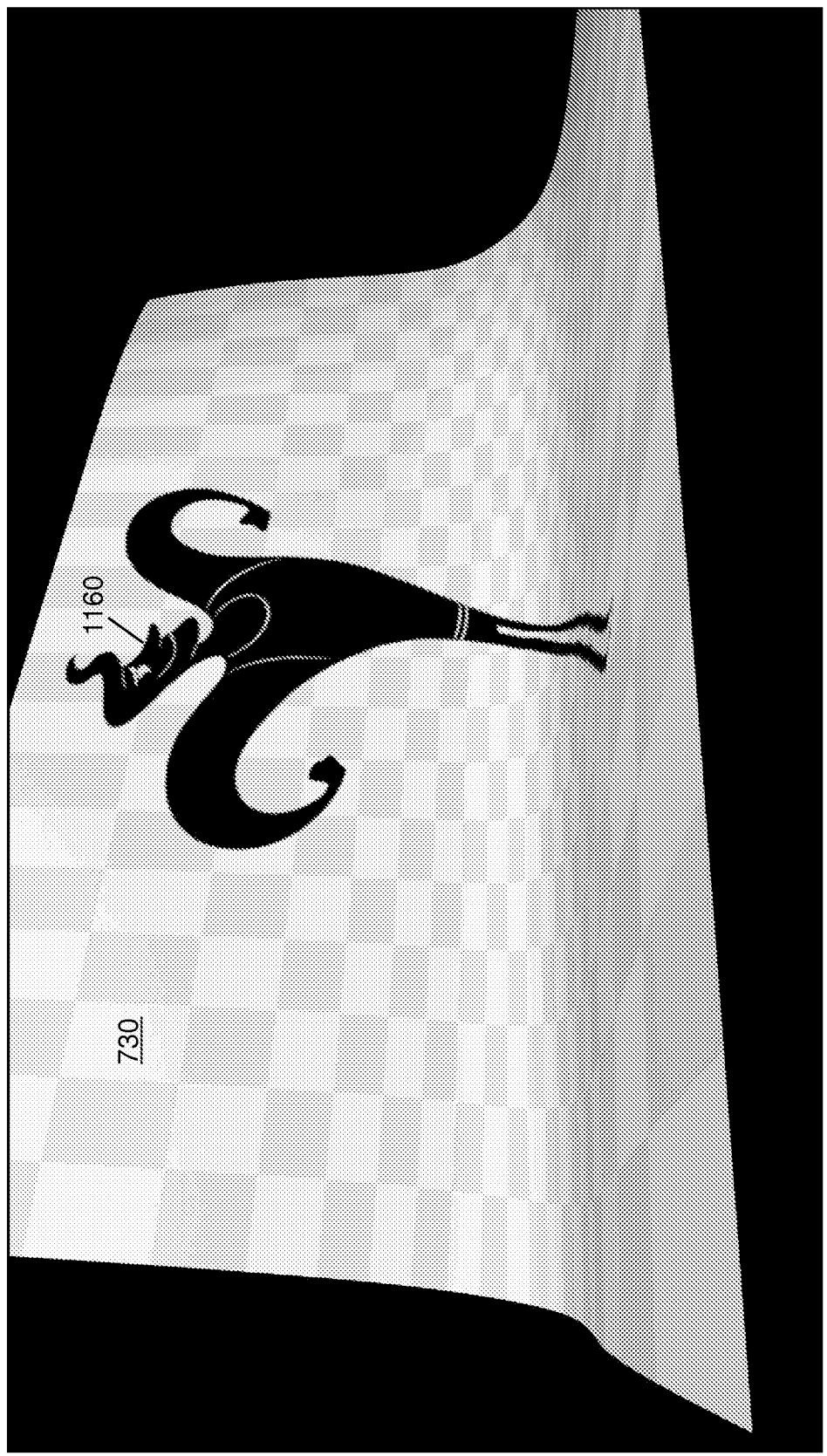
FIG. 12B illustrates an exemplary 3D CGI scene, from the view of a contour camera, with a shadow character drawn on a drawing surface and scene background elements excluded from the view.

Referring again to process 300 of FIG. 3, at block 308, an image of the drawn shadow character may be captured from a second perspective. Such a second perspective may correspond to the view from a contour camera (such as contour camera 222 of FIG. 2) or primary light source, and capturing an image from such a perspective may facilitate producing contouring effects as discussed below based on the same angle as naturally-cast shadows in the scene. In other embodiments, such a second perspective may be the same as or different from various other perspectives discussed herein (e.g., from a drawing camera or shot camera). FIG. 12A illustrates an exemplary 3D CGI scene from such a second perspective with shadow character 1160 drawn on drawing surface 730. Also illustrated in FIG. 12A is 3D modeled character 400 shown transparently for reference. FIG. 12B illustrates another view from the same second perspective with shadow character 1160 drawn on drawing surface 730, but with scene background elements and reference characters excluded from the view, as may be desired in some instances. The perspective shown in FIG. 12A and FIG. 12B may correspond to a contour camera, such as contour camera 222 of FIG. 2. An image of shadow character 1160 may be captured from the perspective of a contour camera (e.g., using the contour camera to capture the image). The captured image may include only shadow character 1160, or it may include other elements in the view. For example, shadow character 1160 may be captured from a view like that of FIG. 12B without drawing surface 730 or any other objects.

In some embodiments, the contour camera may be positioned at the primary light source (e.g., primary light source 220), thereby capturing the image from the same angle as naturally-cast shadows in the scene. In other embodiments, the contour camera may be positioned near the primary light source or at other positions to achieve different effects. Notably, from the perspective of a light source that causes a shadow to be cast, the cast shadow may appear whole regardless of the complex surface or surfaces on which it falls (assuming visibility through the illuminated object). As such, while shadow character 1160 may have appeared with long, curved legs in the drawing camera perspective of FIG. 11, shadow character 1160 may appear more natural with normally-proportioned legs in the contour camera perspective of FIG. 12A. This may help create natural-looking contouring of the shadow character, as discussed below with reference to FIGS. 13, 14A, and 14B.

Figure 13:
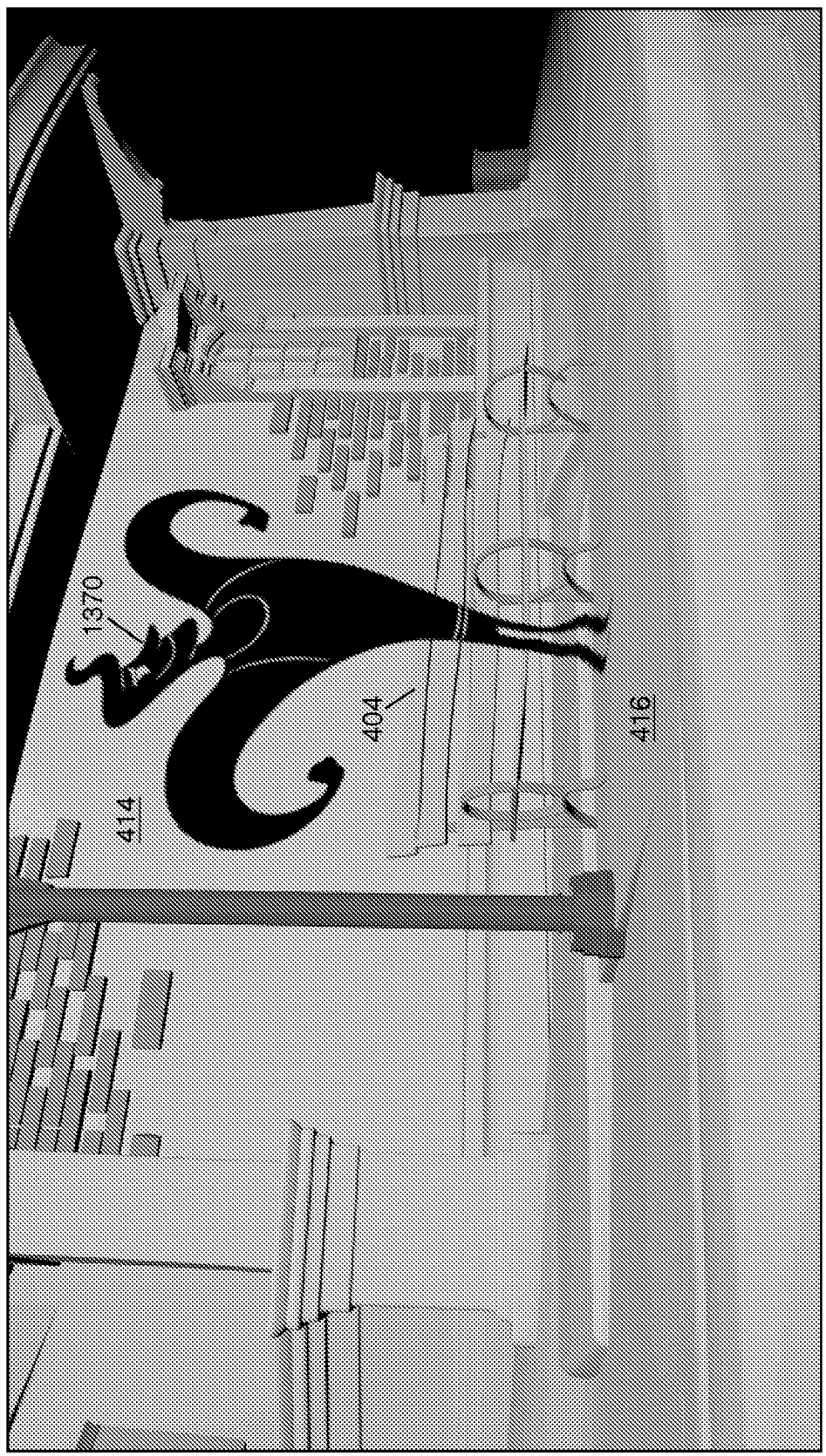
FIG. 13 illustrates an exemplary 3D CGI scene, from the view of a contour camera, with a shadow character projected into the scene.

Referring again to process 300 of FIG. 3, at block 310, the simplified drawing surface and the drawn shadow character may be removed from the 3D CGI scene. At block 312, the captured drawn shadow character image may be projected into the 3D CGI scene from the second perspective (e.g., rendered into the scene from the contour camera). Projecting the captured image into the 3D CGI scene from the second perspective may allow the captured image to naturally contour across surfaces in the 3D CGI scene. FIG. 13 illustrates the 3D CGI scene, from the view of the contour camera (e.g., contour camera 222 of FIG. 2), with shadow character 1370 projected into the scene. As illustrated, shadow character 1370 falls onto ground 416, bench 404, and brick wall 414 as though it were the shadow of a corresponding 3D modeled character. As mentioned above, shadow character 1370 may appear whole from the perspective of the contour camera or light source that causes the shadow to be cast despite the complex surfaces on which the shadow falls.

Projecting shadow character 1370 (e.g., captured drawn shadow character 1160 from FIG. 12A) into the scene may be done in a variety of ways. In one embodiment, a contour camera in a 3D CGI environment may be capable of projecting a shadow or other captured image into the scene. As illustrated in FIG. 13, the projected image may be cast onto background or environment objects without a 3D modeled character present in the scene so as to avoid shading the 3D modeled character and to allow the shadow to fall on the appropriate surfaces without interference. In some examples, the 3D modeled character may be added back into the scene after the shadow character has been placed. In other examples, CGI tools may allow users to select which objects are affected by a projected image and which objects are not affected (e.g., which objects are effectively transparent to the projected image), thereby allowing selective control of where the projected image may fall.

In other embodiments, the light source that causes the shadow to be cast (e.g., primary light source 220 of FIG. 2) may be blocked by the captured image of the drawn shadow character to cast a corresponding shadow. For example, the captured shadow character image may be used as a lighting gel, filter, lens, or the like to cause a corresponding shadow to fall into the scene as illustrated in FIG. 13. As mentioned above, in some examples, the 3D modeled character may be excluded until after the shadow is projected to avoid shading the 3D modeled character with the gel, filter, lens, or the like. In other examples, CGI tools may allow users to select which objects are affected by the gel, filter, lens, or the like, and the 3D modeled character may be excluded to allow it to be illuminated by the lighting source as desired. Various other methods may also be used to project shadow character 1370 into the 3D CGI scene, as will be apparent to those of ordinary skill in the art.

In some embodiments, the position from which shadow character 1370 is projected may be varied to achieve different effects. In one embodiment, shadow character 1370 may be projected from a position corresponding to the light source that would cause the corresponding naturally-cast shadow to be cast for the corresponding character (e.g., light source 220 of FIG. 2 that may cause naturally-cast shadow 502 to be cast for character 400 in FIG. 5). In another embodiment, shadow character 1370 may be projected from a position adjacent to the light source, which may cause the projected shadow character to stretch, bend, be repositioned, or the like compared to the naturally-cast shadow for a corresponding character. As mentioned above with reference to block 308 of process 300, the image of the drawn shadow character may be captured from a variety of positions as well. Thus, capture positions and projection positions may be varied as desired to achieve different effects. In some embodiments, the capture position may correspond to the projection position, but in other embodiments, they may be different.

Figure 14A:
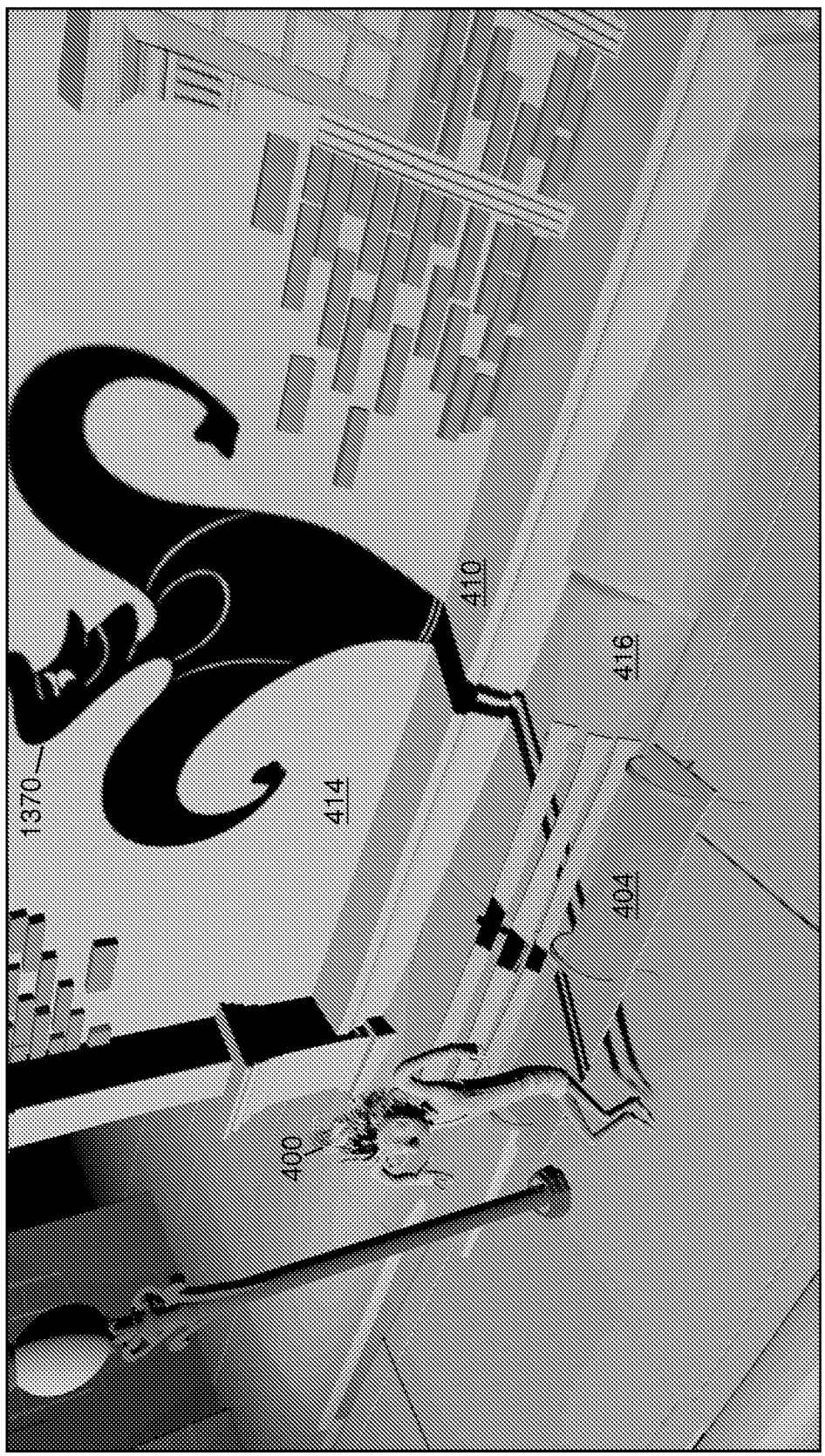
FIG. 14A illustrates an exemplary 3D CGI scene, from the view of a shot camera, with a shadow character replacing a naturally-cast shadow.
Figure 14B:
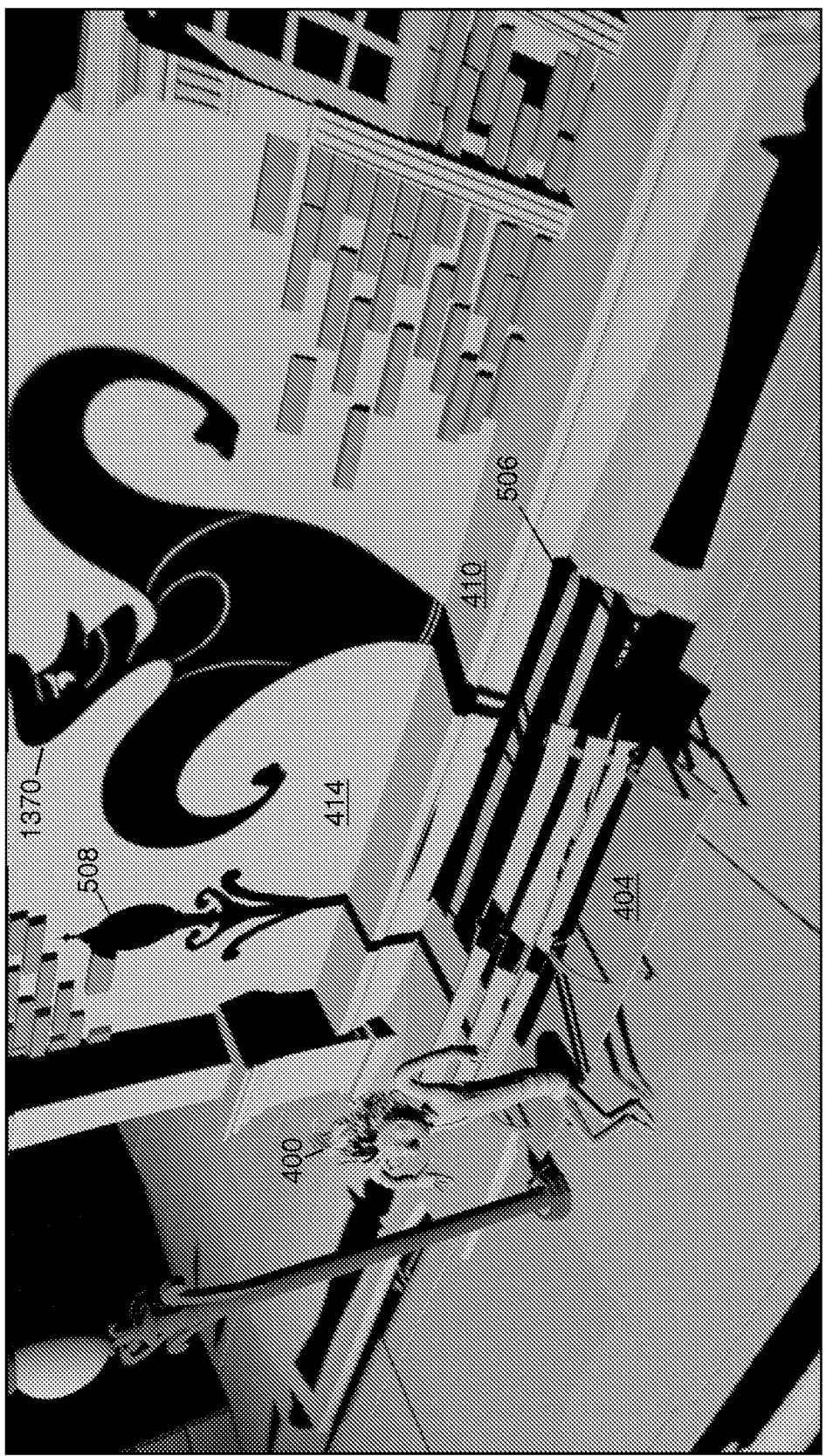
FIG. 14B illustrates an exemplary 3D CGI scene, from the view of a shot camera, including a shadow character along with naturally-cast shadows in the scene.

FIGS. 14A and 14B illustrate the exemplary 3D CGI scene, from a third perspective view—the view of a shot camera (e.g., shot camera 226 of FIG. 2), with shadow character 1370 projected into the scene and contouring to the various 3D surfaces. From this exemplary third perspective view, the scene may be captured having replaced the naturally-cast shadow of character 400 with shadow character 1370. Such a third perspective view may be positioned as desired based on the storyline and desired view of the scene. In some embodiments, such a third perspective view may be the same as various other views discussed herein (e.g., from a drawing camera or contour camera). FIG. 14A illustrates a view of the scene without other shadows, while FIG. 14B illustrates a view of the scene with naturally-cast shadows including shadows 506 and 508 as well as various others. As illustrated in FIGS. 14A and 14B, shadow character 1370 may contour automatically to the various complex surfaces in the scene. For example, shadow character 1370 may fall in what appears to be a natural and accurate way across bench 404, ground 416, ledge 410, and brick wall 414. Notably, drawn character 1160 in FIG. 11 may be much simpler for an artist to draw, excluding the complex contouring effects illustrated in FIGS. 14A and 14B. Thus, process 300 may simplify the animation process while allowing artists to achieve complex contouring effects for shadow characters without requiring artists to draw to match the precise, complex contours.

While the various embodiments discussed herein may refer to animated films, one of ordinary skill in the art will recognize that the various embodiments may be used in producing live-action films, stop motion films, various other imaging workflows, and various other films and film types as well. For example, live-action films may be augmented with CGI elements, and the various embodiments discussed herein may be used in modifying live-action film frames to include shadow characters or other shadow elements (e.g., any artistically-generated shadow feature). In other examples, live-action shadows may be captured from a green-screen or other simplified environment during filming of visual effects elements, or shadows may be generated corresponding to visual effects. The captured or generated live-action shadows may then be used in modifying various scenes to include contoured shadows as part of a visual effect (e.g., contouring a captured or generated shadow of a visual effect explosion over a live-action scene, contouring a captured or generated shadow of a falling stunt character onto live-action scene surfaces, or the like). In such examples, a green screen or other simplified surface may be used much like simplified drawing surfaces discussed herein.

Similarly, one of ordinary skill in the art will recognize that capturing images as discussed herein may be done in any of a variety of ways. In some embodiments, images may be captured digitally or with film-based photographic cameras. In other embodiments, CGI rendering software may be used to virtually capture images. In still other embodiments, various other systems and techniques may be used to artificially generate images in virtual environments or capture real images from real-world environments as desired.

Moreover, while a shadow character is used herein for illustrative purposes, the various embodiments discussed herein may also be used to contour other shadows to objects in a scene (e.g., background shadows, object shadows, artistically-generated shadows, and the like). In addition, various techniques may be applied to a shadow character as with other shadows in a scene to vary the visual effect as desired (e.g., blurring shadow edges, softening shadows, lighting shadows with reflected light, diffusing reflected light, sharpening shadow elements, and the like).

Figure 15:
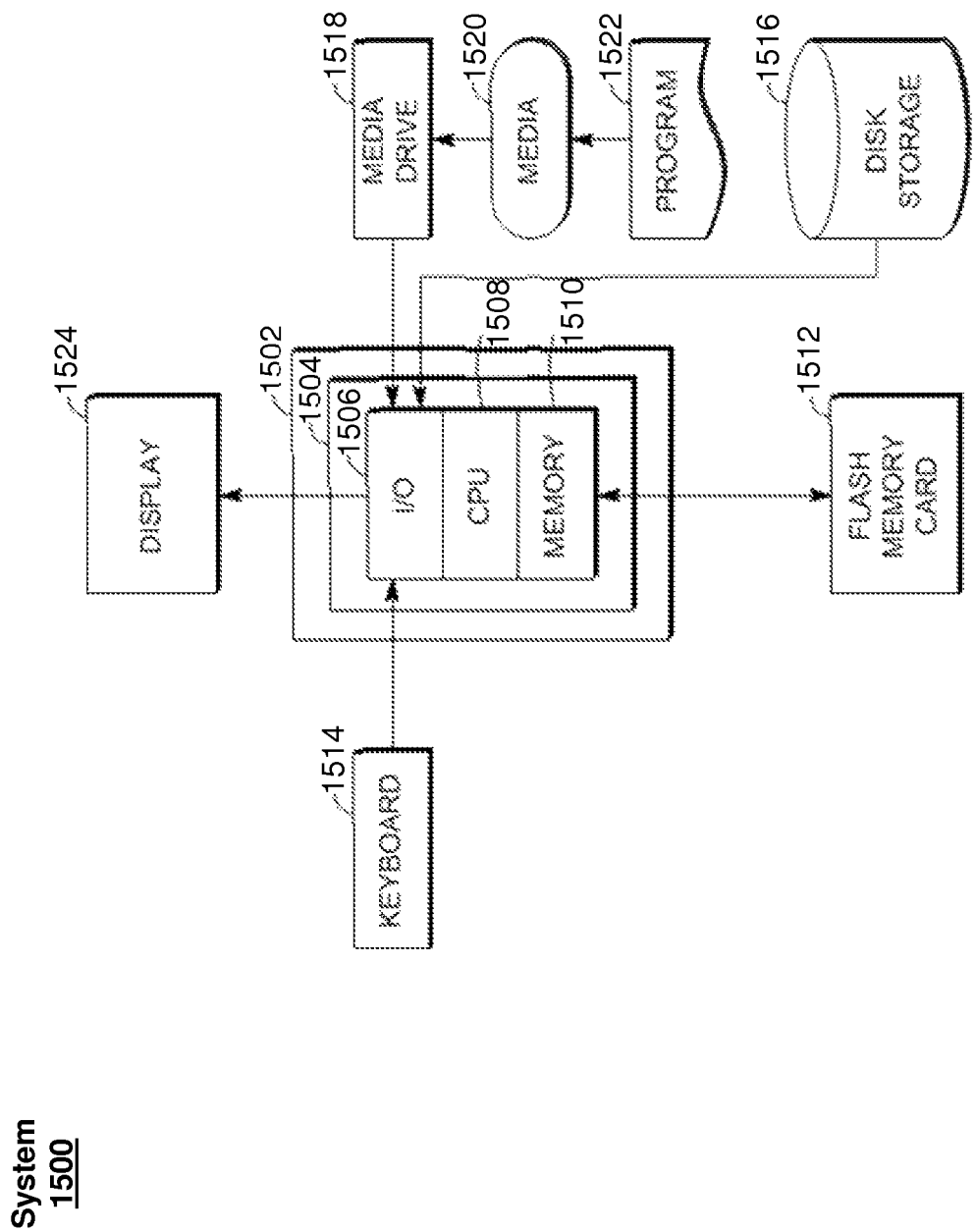
FIG. 15 illustrates an exemplary computing system.

FIG. 15 illustrates an exemplary computing system 1500 configured to perform any one of the above-described processes. In this context, computing system 1500 may include, for example, a processor (which may have multiple cores), memory, storage, and input/output devices (e.g., monitor, keyboard, disk drive, Internet connection, etc.). However, computing system 1500 may include circuitry or other specialized hardware for carrying out some or all aspects of the processes. In some operational settings, computing system 1500 may be configured as a system that includes one or more units, each of which is configured to carry out some aspects of the processes either in software, hardware, or some combination thereof.

FIG. 15 depicts an exemplary computing system 1500 with a number of components that may be used to perform the above-described processes. The main system 1502 includes a motherboard 1504 having an input/output ("I/O") section 1506, one or more central processing units ("CPU") 1508 (which may have multiple cores), and a memory section 1510, which may have a flash memory card 1512 related to it. The I/O section 1506 is connected to a display 1524, a keyboard 1514, a disk storage unit 1516, and a media drive unit 1518. The media drive unit 1518 can read/write a computer-readable medium 1520, which can contain programs 1522 or data.

At least some values based on the results of the above-described processes can be saved for subsequent use. Additionally, a non-transitory computer-readable storage medium can be used to store (e.g., tangibly embody) one or more computer programs for performing any one of the above-described processes by means of a computer. The computer program may be written, for example, in a general purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this disclosure.

What is claimed is:

1. A computer-implemented method for integrating a two-dimensional (2D) drawn shadow character in a three-dimensional (3D) computer generated imagery (CGI) scene with contouring on 3D objects, the method comprising:
   adding a simplified drawing surface to a 3D CGI scene, wherein the simplified drawing surface approximates a 3D object surface in the 3D CGI scene;
   causing a display of the simplified drawing surface in the 3D CGI scene from a first perspective;
   receiving a drawn shadow character on the simplified drawing surface;
   capturing an image of the drawn shadow character from a second perspective;
   removing the simplified drawing surface and the drawn shadow character from the 3D CGI scene; and
   projecting the captured image of the drawn shadow character into the 3D CGI scene from the second perspective, wherein the projected image contours to at least the 3D object surface in the scene.

2. The computer-implemented method of claim 1, further comprising:
   capturing the 3D CGI scene, including the projected drawn shadow character, from a third perspective.

3. The computer-implemented method of claim 2, further comprising:
   causing a display of boundaries in the first perspective corresponding to a field of view of the third perspective.

4. The computer-implemented method of claim 1, wherein projecting the captured image of the drawn shadow character into the 3D CGI scene comprises:
   blocking light from a virtual light source with the captured image of the drawn shadow character to cast a shadow into the 3D CGI scene.

5. The computer-implemented method of claim 1, wherein the 3D object surface in the 3D CGI scene comprises a wall.

6. The computer-implemented method of claim 1, wherein the drawn shadow character is drawn on the simplified drawing surface.

7. The computer-implemented method of claim 1, wherein the drawn shadow character is copied onto the simplified drawing surface.

8. The computer-implemented method of claim 1, wherein a primary light source illuminating the 3D CGI scene is positioned at a location of the second perspective.

9. The computer-implemented method of claim 1, wherein the 3D CGI scene comprises a 3D modeled character, and wherein the drawn shadow character corresponds to the 3D modeled character.

10. The computer-implemented method of claim 9, further comprising:
    causing a display, in the first perspective, of a naturally-cast reference shadow of the 3D modeled character.

11. The computer-implemented method of claim 1, further comprising:
    causing a display, in the first perspective, of a naturally-cast reference shadow of an object in the 3D CGI scene.

12. A non-transitory computer-readable storage medium comprising computer-executable instructions for integrating a two-dimensional (2D) drawn shadow character in a three-dimensional (3D) computer generated imagery (CGI) scene with contouring on 3D objects, the computer-executable instructions comprising instructions for:
    adding a simplified drawing surface to a 3D CGI scene, wherein the simplified drawing surface approximates a 3D object surface in the 3D CGI scene;
    causing a display of the simplified drawing surface in the 3D CGI scene from a first perspective;
    receiving a drawn shadow character on the simplified drawing surface;
    capturing an image of the drawn shadow character from a second perspective;
    removing the simplified drawing surface and the drawn shadow character from the 3D CGI scene; and
    projecting the captured image of the drawn shadow character into the 3D CGI scene from the second perspective, wherein the projected image contours to at least the 3D object surface in the scene.

13. The computer-readable storage medium of claim 12, the computer-executable instructions further comprising instructions for:
    capturing the 3D CGI scene, including the projected drawn shadow character, from a third perspective.

14. The computer-readable storage medium of claim 12, wherein the 3D CGI scene comprises a 3D modeled character, and wherein the drawn shadow character corresponds to the 3D modeled character.

15. The computer-readable storage medium of claim 14, the computer-executable instructions further comprising instructions for:
   causing a display, in the first perspective, of a naturally-cast reference shadow of the 3D modeled character.

16. The computer-readable storage medium of claim 12, the computer-executable instructions further comprising instructions for:
   causing a display, in the first perspective, of a naturally-cast reference shadow of an object in the 3D CGI scene.

17. A system for integrating a two-dimensional (2D) drawn shadow character in a three-dimensional (3D) computer generated imagery (CGI) scene with contouring on 3D objects, the system comprising:
   a memory configured to store data; and
   a computer processor configured to:
      add a simplified drawing surface to a 3D CGI scene, wherein the simplified drawing surface approximates a 3D object surface in the 3D CGI scene;
      cause a display of the simplified drawing surface in the 3D CGI scene from a first perspective;
      receive a drawn shadow character on the simplified drawing surface;
      capture an image of the drawn shadow character from a second perspective;
      remove the simplified drawing surface and the drawn shadow character from the 3D CGI scene; and
      project the captured image of the drawn shadow character into the 3D CGI scene from the second perspective, wherein the projected image contours to at least the 3D object surface in the scene.

18. The system of claim 17, the computer processor further configured to:
   capture the 3D CGI scene, including the projected drawn shadow character, from a third perspective.

19. The system of claim 17, wherein the 3D CGI scene comprises a 3D modeled character, and wherein the drawn shadow character corresponds to the 3D modeled character.

20. The system of claim 19, the computer processor further configured to:
   cause a display, in the first perspective, of a naturally-cast reference shadow of the 3D modeled character.

21. The system of claim 17, the computer processor further configured to:
   cause a display, in the first perspective, of a naturally-cast reference shadow of an object in the 3D CGI scene.

22. The computer-implemented method of claim 1, wherein the simplified drawing surface is added after the three-dimensional (3D) computer generated imagery (CGI) scene is generated.

23. The computer-readable storage medium of claim 12, wherein the simplified drawing surface is added after the three-dimensional (3D) computer generated imagery (CGI) scene is generated.

24. The system of claim 17, wherein the simplified drawing surface is added after the three-dimensional (3D) computer generated imagery (CGI) scene is generated.

* * * * *